United States Patent

Martell et al.

[11] Patent Number: 5,186,725
[45] Date of Patent: Feb. 16, 1993

[54] ABRASIVE PRODUCTS

[76] Inventors: Trevor J. Martell, 8 Erica Place, Vale Road, Weltevreden Park; Moosa M. Adia, 1966 Peacock Street, Lenasia South, both of Transvaal, South Africa

[21] Appl. No.: 624,561

[22] Filed: Dec. 10, 1990

[30] Foreign Application Priority Data

Dec. 11, 1989 [ZA] South Africa ............... 89/9440

[51] Int. Cl.$^5$ ............................................. B24D 3/00
[52] U.S. Cl. ........................................... 51/293; 51/308
[58] Field of Search ................................. 51/293, 308

[56] References Cited

U.S. PATENT DOCUMENTS

| | | | |
|---|---|---|---|
| 3,306,720 | 2/1967 | Darrow | 51/293 |
| 3,743,489 | 7/1973 | Wentorf, Jr. et al. | 51/307 |
| 3,745,623 | 7/1973 | Wentorf, Jr. et al. | 29/95 |
| 3,767,371 | 10/1973 | Wentorf, Jr. et al. | 51/307 |
| 3,913,280 | 10/1975 | Hall | 264/125 |
| 4,063,909 | 12/1977 | Mitchell | 51/309 |
| 4,151,686 | 5/1979 | Lee et al. | 264/332 |
| 4,224,380 | 9/1980 | Bovenkerk et al. | 51/307 |
| 4,466,938 | 8/1984 | Gigl et al. | 264/332 |
| 4,534,773 | 8/1985 | Phaal et al. | 51/293 |
| 4,673,414 | 6/1987 | Lavens et al. | 51/293 |
| 4,793,828 | 12/1988 | Burnand | 51/307 |
| 4,874,398 | 10/1989 | Ringwood | 51/307 |
| 4,931,068 | 6/1990 | Dismukes et al. | 51/293 |
| 5,011,514 | 4/1991 | Cho et al. | 51/295 |

FOREIGN PATENT DOCUMENTS 2158086  3/1985  United Kingdom .

OTHER PUBLICATIONS

Chemical Abstracts, 105(6), 47853g (1986).

*Primary Examiner*—William R. Dixon, Jr.
*Assistant Examiner*—Willie J. Thompson
*Attorney, Agent, or Firm*—Scully, Scott, Murphy & Presser

[57] ABSTRACT

A method of making an abrasive product involves crushing a diamond abrasive compact, typically a thermally stable diamond abrasive compact, and then reconstituting the fragments so produced under diamond synthesis conditions.

6 Claims, No Drawings

ABRASIVE PRODUCTS

BACKGROUND OF THE INVENTION

This invention relates to abrasive products.

Abrasive compacts are well known in the art and are used for a variety of abrading operations such as cutting, drilling, grinding and the like. Abrasive compacts consist of a poylcrystalline mass of bonded abrasive particles, the abrasive particle content generally being at least 70 percent by volume and more particularly 80 to 90 percent by volume. The abrasive particles may be self bonded without the aid or use of a second or bonding phase. Alternatively, a second or bonding phase may be provided. The abrasive particles for compacts are invariably diamond or cubic boron nitride.

Abrasive compacts may be bonded to cemented carbide supports. Such bonded compacts are often referred to as composite compacts. Bonding between the compact and the carbide support may be direct or a bonding layer of a suitable braze may be provided between the compact and the carbide support.

Abrasive compacts and composite compacts are described and illustrated in a number of published patent specifications, for example U.S. Pat. Nos. 3,743,489, 3,767,371, 4,063,909 and 3,745,623.

Diamond abrasive compacts which contain a second phase of a diamond catalyst/solvent tend to degrade at temperatures exceeding 700° C. Diamond abrasive compacts which are thermally stable at these high temperatures are known and are described, for example, in U.S. Pat. Nos. 4,534,773, 4,224,380 and British Patent No. 2,158,086.

U.S. Pat. No. 4,673,414 describes a method of making a re-sintered CBN compact which comprises providing a batch of boron-rich polycrystalline CBN particles and sintering these particles at a pressure and temperature adequate to re-sinter the particles, the temperature being maintained below the reconversion temperature of CBN. The method is said to result in the formation of superior polycrystalline CBN compacts without the aid of a catalyst at pressure and temperature conditions which are typically employed in processes which utilise a catalyst. The method is restricted to the use of boron-rich polycrystalline cubic boron nitride particles.

SUMMARY OF THE INVENTION

According to the present invention, there is provided a method of making an abrasive product including the steps of providing a diamond abrasive compact, fragmenting the compact into a plurality of fragments, placing the fragments in a suitable reaction capsule, placing the capsule in the reaction zone of a high temperature/high pressure apparatus and subjecting the contents of the capsule to elevated temperature and pressure conditions for a time sufficient to produce a coherent product of the fragments.

DESCRIPTION OF EMBODIMENTS

The invention produces an abrasive product which is, in effect, a diamond abrasive compact having a rough outer surface. The rough outer surface enables the abrasive compact to key better to the working surface of an abrasive tool in which it is incorporated.

The method involves first fragmenting a diamond abrasive compact into a plurality of fragments. Preferably, the fragments will be small, i.e. having a size not exceeding 1.5 mm.

Fragmentation will typically take place by crushing the diamond abrasive compact. This will produce fragments or pieces which have a rough, irregular outer surface.

The fragments may be taken as such and placed in a suitable reaction capsule for insertion into the reaction zone of a high temperature/high pressure apparatus. Alternatively, a suitable metal or second phase may be included and, when included, will preferably be caused to infiltrate the fragments during sintering and compaction.

The contents of the reaction capsule will typically be subjected to a pressure of at least 25 kilobars and a temperature of 1100° C. or higher. These conditions will typically be maintained for a period of at least 10 minutes. Under these conditions, the fragments are sintered together forming a coherent hard product which can be recovered from the reaction capsule by methods known in the art. The elevated temperature and pressure conditions are preferably in the diamond stable region of the carbon phase diagram.

The diamond abrasive compact which is fragmented will be made of diamond particles which do not contain any boron or, if they do contain some boron, it will be present in trace amounts only.

The diamond abrasive compact which is fragmented will preferably be a thermally stable diamond abrasive compact, i.e. one which does not degrade to any significant extent when subjected to temperatures of the order of 1200° C. in a vacuum, inert or non-oxidising atmosphere. Examples of suitable compacts of this type are those described in U.S. Pat. No. 4,534,773 and British Patent No. 2,158,086. Both of these compacts have a second phase which contains a high content of, or consists of, silicon in the form of silicon, silicon carbide and/or a metal silicide.

The abrasive products produced by the method of the invention may be used in a variety of abrasive tools such as drill bits, cutting tools, grinding wheels, wire drawing dies and the like.

An example of the invention will now be described. A diamond abrasive compact was produced using the method described in British Patent No. 2,158,086. The diamond abrasive compact thus produced consisted of a mass of diamond particles present in an amount of 80 to 90 percent by volume of the compact and a second phase present in an amount of 10 to 20 percent by volume of the compact, the mass of diamond particles containing substantial diamond-to-diamond bonding to form a coherent, skeletal mass and a second phase consisting essentially of silicon, the silicon being in the form of silicon and/or silicon carbide.

This diamond compact was then crushed producing a mass of particles or fragments having an average size of less than 1.5 mm. This mass of particles was placed in the reaction capsule of a conventional high temperature/high pressure apparatus. The capsule was placed in the reaction zone of this apparatus and the contents of the capsule subjected to a temperature of 1500° C. and a pressure of 50 kilobars. These elevated conditions of temperature and pressure were maintained for a period of 20 minutes.

The reaction capsule was removed from the apparatus and the product from the capsule recovered using known techniques. This product was coherent and hard and had the abrasive properties at least as good as and the appearance of a conventional diamond compact. It also had a rough outer surface which provided a good surface for keying to the working surface of an abrasive tool.

We claim:

1. A method of making an abrasive product includes the steps of providing a polycrystalline diamond abrasive compact, fragmenting the compact into a plurality of polycrystalline diamond fragments having a rough, irregular outer surface, placing the fragments, as such from the fragmenting step, in a suitable reaction capsule, placing the capsule in the reaction zone of a high temperature/high pressure apparatus and subjecting the contents of the capsule to elevated temperature and pressure conditions for a time sufficient to produce a coherent product of the fragments, said coherent product being a diamond abrasive compact having a rough outer surface.

2. A method of claim 1 wherein the fragments have a size not exceeding 1.5 mm.

3. A method of claim 1 or claim 2 wherein the fragmentation of the compact takes place by crushing.

4. A method of claim 1 wherein the diamond abrasive compact is one which does not degrade to any significant extent when subjected to a temperature of the order of 1200° C. in a vacuum, an inert or a non-oxidising atmosphere.

5. A method of claim 4 wherein the diamond abrasive compact has a second phase which consists of silicon in the form of silicon, silicon carbide and/or a metal silicide.

6. A method of claim 1 wherein the contents of the reaction capsule are subjected to a pressure of at least 25 kilobars and a temperature of at least 1100° C.

* * * * *